US008326775B2

(12) United States Patent
Raichelgauz et al.

(10) Patent No.: US 8,326,775 B2
(45) Date of Patent: Dec. 4, 2012

(54) SIGNATURE GENERATION FOR MULTIMEDIA DEEP-CONTENT-CLASSIFICATION BY A LARGE-SCALE MATCHING SYSTEM AND METHOD THEREOF

(75) Inventors: Igal Raichelgauz, Herzelia (IL); Karina Odinaev, Haifa (IL); Yehoshua Y. Zeevi, Haifa (IL)

(73) Assignee: Cortica Ltd., Tirat Carmel (IL)

( * ) Notice: Subject to any disclaimer, the term of this patent is extended or adjusted under 35 U.S.C. 154(b) by 736 days.

(21) Appl. No.: 12/195,863

(22) Filed: Aug. 21, 2008

(65) Prior Publication Data

US 2009/0043818 A1     Feb. 12, 2009

Related U.S. Application Data

(63) Continuation-in-part of application No. 12/084,150, filed as application No. PCT/IL2006/001235 on Oct. 26, 2006.

(30) Foreign Application Priority Data

Oct. 26, 2005    (IL) ........................................ 171577
Jan. 29, 2006    (IL) ........................................ 173409
Aug. 21, 2007    (IL) ........................................ 185414

(51) Int. Cl.
     *G06F 17/30*      (2006.01)
(52) U.S. Cl. ........................................................ 706/10
(58) Field of Classification Search .................... 706/10, 706/21; 370/352; 382/261
See application file for complete search history.

(56) References Cited

U.S. PATENT DOCUMENTS

| 6,243,375 | B1 * | 6/2001 | Speicher ........................ 370/352 |
| 6,611,628 | B1 | 8/2003 | Sekiguchi et al. |
| 6,754,435 | B2 | 6/2004 | Kim |
| 6,819,797 | B1 | 11/2004 | Smith et al. |
| 6,901,207 | B1 | 5/2005 | Watkins |

(Continued)

FOREIGN PATENT DOCUMENTS

WO      02/31764      4/2002

(Continued)

OTHER PUBLICATIONS

Iwamoto, K.; Kasutani, E.; Yamada, A.; , "Image Signature Robust to Caption Superimposition for Video Sequence Identification," Image Processing, 2006 IEEE International Conference on , vol., No., pp. 3185-3188, Oct. 8-11, 2006 doi: 10.1109/ICIP.2006.313046 URL: http://ieeexplore.ieee.org/stamp/stamp.jsp?tp=&arnumber=4107247&isnumber=4106440.*

(Continued)

*Primary Examiner* — Jeffrey A Gaffin
*Assistant Examiner* — Ola Olude-Afolabi
(74) *Attorney, Agent, or Firm* — Myers Wolin, LLC (57) ABSTRACT

Content-based clustering, recognition, classification and search of high volumes of multimedia data in real-time. The invention is dedicated to real-time fast generation of signatures to high-volume of multimedia content-segments, based on relevant audio and visual signals, and to scalable matching of signatures of high-volume database of content-segments' signatures. The invention can be implemented in any applications which involve large-scale content-based clustering, recognition and classification of multimedia data, such as, content-tracking, video filtering, multimedia taxonomy generation, video fingerprinting, speech-to-text, audio classification, object recognition, video search and any other application requiring content-based signatures generation and matching for large content volumes such as, web and other large-scale databases.

22 Claims, 6 Drawing Sheets

U.S. PATENT DOCUMENTS

| | | | |
|---|---|---|---|
| 7,013,051 | B2 | 3/2006 | Sekiguchi et al. |
| 7,260,564 | B1 | 8/2007 | Lynn et al. |
| 7,302,117 | B2 | 11/2007 | Sekiguchi et al. |
| 7,313,805 | B1 | 12/2007 | Rosin et al. |
| 2001/0019633 | A1* | 9/2001 | Tenze et al. .................. 382/261 |
| 2004/0153426 | A1 | 8/2004 | Nugent |
| 2005/0177372 | A1 | 8/2005 | Wang et al. |
| 2006/0236343 | A1 | 10/2006 | Chang |
| 2006/0253423 | A1 | 11/2006 | McLane et al. |
| 2007/0074147 | A1 | 3/2007 | Wold |
| 2007/0130159 | A1 | 6/2007 | Gulli et al. |
| 2007/0244902 | A1 | 10/2007 | Seide et al. |
| 2007/0253594 | A1 | 11/2007 | Lu et al. |
| 2008/0072256 | A1 | 3/2008 | Boicey et al. |

FOREIGN PATENT DOCUMENTS

| | | |
|---|---|---|
| WO | 2007/0049282 | 5/2007 |

OTHER PUBLICATIONS

Lin, C.; Chang, S.;, "Generating Robust Digital Signature for Image/Video Authentication, "Multimedia and Security Workshop at ACM Multimedia '98. Bristol, U.K. Sep. 1998, pp. 49-54.*

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251 German National Research Center for Information Technology.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Xian-Sheng Hua et al. "Robust Video Signature Based on Ordinal Measure" In: 2004 International Conference on Image Processing, Microsoft Research Asia, Beijing 100080, China, 2004, pp. 685-688.

International Search Authority: "Written Opinion of the International Searching Authority" (PCT Rule 43bis.1) Date of Mailing: Jan. 28, 2009.

Maass, W. et al.: "Computational Models for Generic Cortical Microcircuits", Institute for Theoretical Computer Science, Technische Universitaet Graz, Graz, Austria, published Jun. 10, 2003.

International Search Report for the related International Patent Application PCT/IL2006/001235; Date of Mailing: Nov. 2, 2008.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; Date of Issuance: Jul. 28, 2009.

IPO Examination Report under Section 18(3) for corresponding UK application No: GB1001219.3, dated Sep. 12, 2011.

IPO Examination Report under Section 18(3) for corresponding UK application No. GB1001219.3, dated May 30, 2012.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robots Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314, first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

IPO Examination Report under Section 18(3) for corresponding UK application No. GB1001219.3, dated Aug. 10, 2012.

* cited by examiner

Signature:

Robust Signature:

SIGNATURE GENERATION FOR MULTIMEDIA DEEP-CONTENT-CLASSIFICATION BY A LARGE-SCALE MATCHING SYSTEM AND METHOD THEREOF

CROSS REFERENCE TO RELATED APPLICATIONS

This application is a continuation-in-part of U.S. application Ser. No. 12/084,150 filed on Apr. 25, 2008, now pending, which is the National Stage of International Application No. PCT/IL2006/001235, filed on Oct. 26, 2006, which claims foreign priority from Israeli Application No. 171577 filed on Oct. 26, 2005, and Israeli Application No. 173409 filed on 29 Jan. 2006. This application also claims priority under 35 USC 119 from Israeli Application No. 185414, filed on Aug. 21, 2007, now pending. All of the applications referenced above are herein incorporated by reference.

TECHNICAL FIELD

The invention generally relates to content-based clustering, recognition, classification and search of high volumes of multimedia data in real-time, and more specifically to real-time, fast generation of signatures of high-volume of multimedia content-segments.

BACKGROUND OF THE INVENTION

With the abundance of multimedia data made available through various means in general and the Internet and world-wide web (WWW) in particular, there is also a need to provide for effective ways of searching for such multimedia data. Searching for multimedia data in general and video data in particular may be challenging at best due to the huge amount of information that needs to be checked. Moreover, when it is necessary to find a specific content of video, the prior art cases revert to various metadata that describes the content of the multimedia data. However, such content may be complex by nature and not necessarily adequately documented as metadata.

The rapidly increasing multimedia databases, accessible for example through the Internet, calls for the application of effective means for search-by-content. Searching for multimedia in general and for video data in particular is challenging due to the huge amount of information that has to be classified. Moreover, prior art techniques revert to model-based methods to define and/or describe multimedia data. However, by its very nature, the structure of such multimedia data may be too complex to be adequately represented by means of metadata. The difficulty arises in cases where the target sought for multimedia data cannot be adequately defined in words, or respective metadata of the multimedia data. For example, it may be desirable to locate a car of a particular model in a large database of video clips or segments. In some cases the model of the car would be part of the metadata but in many cases it would not. Moreover, the car may be at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "The Architecture") typically consists of a large ensemble of randomly, independently, generated, heterogeneous processing cores, mapping in parallel data-segments onto a high-dimensional space and generating compact signatures for classes of interest. The Architecture is based on a PCT patent application number WO 2007/049282 and published on May 3, 2007, entitled "A Computing Device, a System and a Method for Parallel Processing of Data Streams", assigned to common assignee, and is hereby incorporated by reference for all the useful information it contains.

It would be advantageous to use The Architecture to overcome the limitations of the prior art described hereinabove. Specifically, it would be advantageous to show a framework, a method, a system and respective technological implementations and embodiments, for large-scale matching-based multimedia deep content classification, that overcomes the well-known limitations of the prior art.

SUMMARY OF THE INVENTION

Certain embodiments of the invention include a system and method for content-based clustering, recognition, classification and search of high volumes of multimedia data in real-time. The method and system are dedicated to real-time fast generation of signatures to high-volume of multimedia content-segments, based on relevant audio and visual signals, and to scalable matching of signatures of high-volume database of content-segments' signatures. The method and system can be implemented in any applications which involve large-scale content-based clustering, recognition and classification of multimedia data, such as, content-tracking, video filtering, multimedia taxonomy generation, video fingerprinting, speech-to-text, audio classification, object recognition, video search and any other application requiring content-based signatures generation and matching for large content volumes such as, web and other large-scale databases.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments of the invention include a framework, a method, a system and their technological implementations and embodiments, for large-scale matching-based multimedia Deep Content Classification (DCC). The system is based on an implementation of a computational architecture ("The Architecture") based on "A Computing Device, a System and a Method for Parallel Processing of Data Streams" technology, having a PCT patent application number WO 2007/049282 and published on May 3, 2007. The Architecture consists of a large ensemble of randomly, independently, generated, heterogeneous processing computational cores, mapping in parallel data-segments onto a high-dimensional space and generating compact signatures for classes of interest.

In accordance with the principles of the invention, a realization of The Architecture embedded in large-scale matching system ("The System") for multimedia DCC is disclosed. The Architecture receives as an input stream, multimedia content segments, injected in parallel to all computational cores. The computational cores generate compact signatures for the specific content segment, and/or for a certain class of equivalence and interest of content-segments. For large-scale volumes of data, the signatures are stored in a conventional way in a database of size N, allowing match between the generated signatures of a certain content-segment and the signatures in the database, in low-cost, in terms of complexity, i.e. $<= O(\log N)$, and response time.

For the purpose of explaining the principles of the invention there are now demonstrated two embodiments: a Large-Scale Video Matching System; and a Large-Scale Speech-to-Text System. However, it is appreciated that other embodiments will be apparent to one of ordinary skill in the art.

Characteristics and advantages of the System include but are not limited to:
The System is flat and generates signatures at an extremely high throughput rate;
The System generates robust natural signatures, invariant to various distortions of the signal;
The System is highly-scalable for high-volume signatures generation;
The System is highly-scalable for matching against large-volumes of signatures;
The System generates Robust Signatures for exact-match with low-cost, in terms of complexity and response time;
The System accuracy is scalable versus the number of computational cores, with no degradation effect on the throughput rate of processing;
The throughput of The System is scalable with the number of computational threads, and is scalable with the platform for computational cores implementation, such as FPGA, ASIC, etc.; and
The signatures produced by The System are task-independent, thus the process of classification, recognition and clustering can be done independently from the process of signatures generation, in the superior space of the generated signatures.

Large-Scale Video Matching System

The goal of a large-scale video matching system is effectively to find matches between members of large-scale Master DB of video content-segments and a large-scale Target DB of video content-segments. The match between two video content segments should be invariant to a certain set of statistical distortions performed independently on two relevant content-segments. Moreover, the process of matching between a certain content-segment from Master DB to Target DB consisting of N segments, cannot be done by matching directly the Master content-segment to all N Target content-segments, for large-scale N, since such a complexity of O(N), will lead to non-practical response times. Thus, the representation of content-segments by both Robust Signatures and Signatures is critical application-wise. The System embodies a specific realization of The Architecture for the purpose of Large-Scale Video Matching System.

Figure 1:
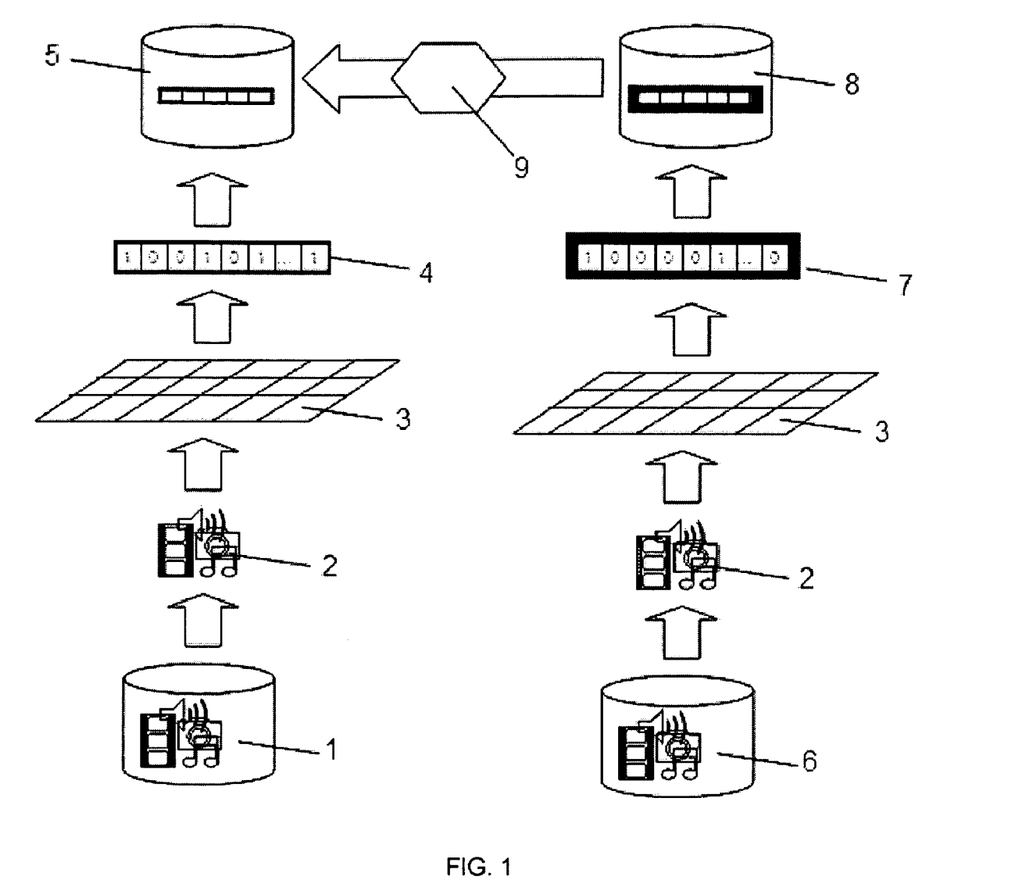
FIG. 1 is the block diagram showing the basic flow of a for large-scale video matching system implemented in accordance with certain embodiments of the invention.

A high-level description of the process for large-scale video matching is depicted in FIG. 1. Video content segments (2) from Master and Target databases (6) and (1) are processed in parallel by a large number of independent computational Cores (3) that constitute the Architecture. Further details are provides in the cores generator for Large-Scale Video Matching System section below. The independent Cores (3) generate a database of Robust Signatures and Signatures (4) for Target content-segments (5) and a database of Robust Signatures and Signatures (7) for Master content-segments (8). The process of signature generation is shown in detail in FIG. 6. Finally, Target Robust Signatures and/or Signatures are effectively matched, by matching algorithm (9), to Master Robust Signatures and/or Signatures database to find all matches between the two databases.

To demonstrate an example of signature generation process, it is assumed, merely for the sake of simplicity and without limitation on the generality of the invention, that the signatures are based on a single frame, leading to certain simplification of the computational cores generation. This is further described in the cores generator for Large-Scale Video Matching System section. The system is extensible for signatures generation capturing the dynamics in-between the frames.

Signature Generation

Creation of Signature Robust to Additive Noise

Assuming L computational cores, generated for Large-Scale Video Matching System. A frame i is injected to all the cores. The cores generate two binary response vectors the Signature $\vec{S}$ and Robust Signature $\vec{RS}$.

For generation of signatures robust to additive noise, such White-Gaussian-Noise, scratch, etc., but not robust to distortions, such as crop, shift and rotation, the core $C_i=\{n_i\}$ may consist of a single (LTU) node or more nodes. The node equations are:

$$V_i = \sum_j w_{ij} k_j$$

where, $n_i = \theta(V_i - Th_S)$ and
$\theta$ is a Heaviside step function; $w_{ij}$ is a coupling node unit (CNU) between node i and image component j (for example, grayscale value of a certain pixel j);
$k_j$ is an image component j (for example, grayscale value of a certain pixel j);
$Th_x$ is a constant Threshold value where x is 'S' for Signature and 'RS' for Robust Signature; and
$V_i$ is a coupling node value.

Figure 2:
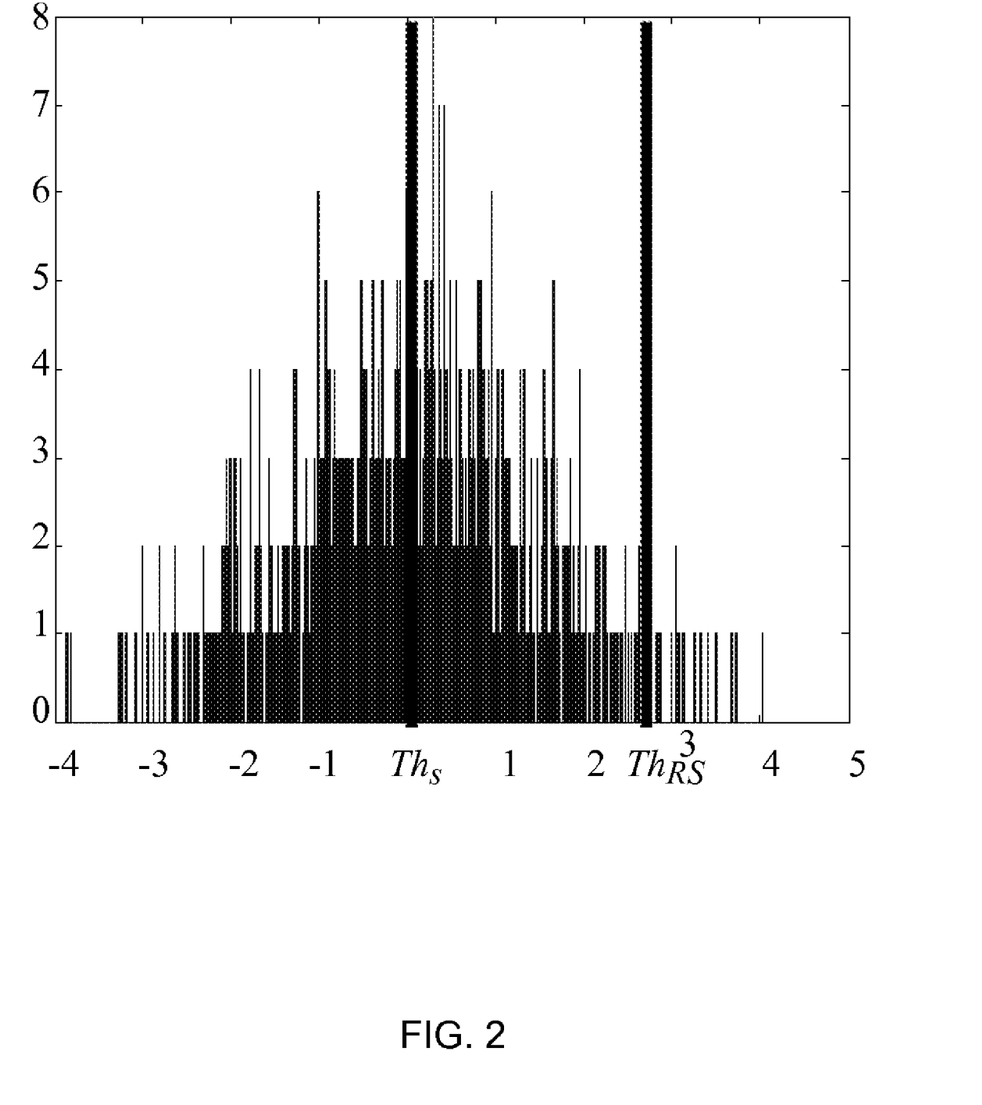
FIG. 2 is a bars-plot showing an example of certain distribution of values of coupling node.

The Threshold $Th_x$ values are set differently for Signature generation and for Robust Signature generation. For example, as shown in FIG. 2, for a certain distribution of $V_i$ values (for the set of nodes), the thresholds for Signature $Th_S$ and Robust Signature $Th_{RS}$ are set apart, after optimization, according to the following criteria:

I: For: $V_i > Th_{RS}$
   $1 - p(V > Th_S) = 1 - (1-\epsilon)^l \ll 1$
   i.e., given that I nodes (cores) constitute a Robust Signature of a certain image I, the probability that not all of these I nodes will belong to the Signature of same, but noisy image, Ĩ is sufficiently low (according to a system's specified accuracy).

II: $p(V_i > Th_{RS}) \approx l/L$
   i.e., approximately I out of the total L nodes can be found to generate Robust Signature according to the above definition.

Figure 3:
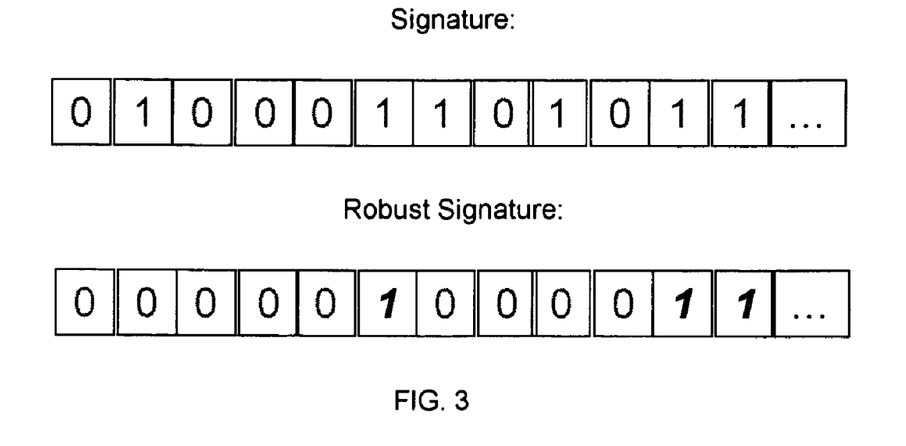
FIG. 3 is an example of a Signature and a corresponding Robust Signature for a certain frame.

III: Both Robust Signature and Signature are generated for a certain frame i. An example for generating Robust Signature and Signature for a certain frame is provided in FIG. 3.

Creation of Signatures Robust to Noise and Distortions

Assume L denotes the number of computational cores in the System. Having generated L cores by the core generator that constitute the Large-Scale Video Matching System, a frame i is injected to all the computational cores. The computational cores map the image frame onto two binary response vectors: the Signature $\vec{S}$ and the Robust Signature $\vec{RS}$.

In order to generate signatures robust to additive noises, such as White-Gaussian-Noise, scratch, etc., and robust to distortions, such as crop, shift and rotation, etc., the core $C_i$ should consist of a group of nodes (LTUs): $C_i\{n_{im}\}$, where m is the number of nodes in each core i, generated according to certain statistical process, modeling variants of certain set of distortions.

The first step in generation of distortions-invariant signatures is to generate m Signatures and Robust Signatures, based on each of the m nodes in all the L cores, according to the previously-described (above) algorithm. The next step is to determine a subset V of m potential signatures-variants for certain frame i. This is done by defining a certain consistent and robust selection criterion, for example, select top f signature-variants out of m, with highest firing-rate across all L computational cores. The reduced set will be used as Signature and Robust Signature, invariant to distortions which were defined and used in the process of computational cores generation.

Computational Cores Generation

Computational Cores Generation is a process of definition, selection and tuning the Architecture parameters for a certain realization in specific system and application. The process is based on several design considerations, such as:

(a) The cores should be designed so as to obtain maximal independence, i.e., the projection from a signal space should generate a maximal pair-wise distance between any two computational cores' projections in a high-dimensional space.

(b) The computational cores should be optimally designed for the type of signals, i.e. the computational cores should be maximally sensitive to the spatio-temporal structure of the injected signal, for example, and in particular, sensitive to local correlations in time and space.

(c) The computational cores should be optimally designed with regard to invariance to set of signal distortions, of interest in relevant application.

Following is a non-limiting example of core-generator module for large-scale video-matching system is presented. The first step is a generation of L nodes, 1 for each of the L computational cores, following design optimization criteria (a) and (b).

Criterion (a) is implemented by formulating it as a problem of generating L projections, sampling uniformly a D-dimensional hemisphere. This problem cannot be solved analytically for an arbitrary L. However, there are singular solutions, obtained by Neil Sloane for a certain number of points for a given dimension. The definition of core-generator stochastic process is based on this singular solution. Another constraint embedded in this process definition is local distribution of coupling node currents (CNCs) according to design optimization criterions (b), i.e. the sparse connectivity has local characteristics in image space. Other solutions of almost uniform tessellations exist.

The second step is to fulfill design optimization criterion (c), by generating for each of the nodes of the computational cores, M variants, so that the cores will produce signatures robust to specific distortions of interest. This is done by applying to the functions of each node M.

Large-Scale Speech-to-Text System

The goal of large-scale speech-to-text system is to reliably translate fluent prior art technologies are based on model-based approaches, i.e., speech recognition through phonemes recognition and/or word recognition by Hidden-Markov-Models (HMM) and other methods, natural-language-processing techniques, language models and more, the disclosed approach constitutes a paradigm-shift in the speech-recognition domain. The disclosed System for speech-to-text is based on a previously-disclosed computational paradigm-shift, The Architecture.

Figure 4:
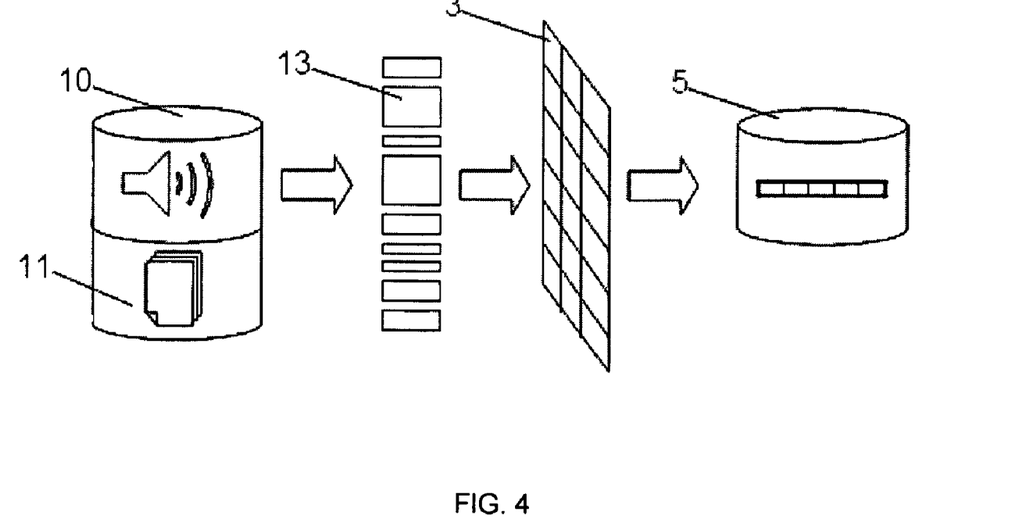
FIG. 4 is a diagram depicting the process of generating a signature for a segment of speech implemented in accordance with certain embodiments of the invention.

FIG. 4 shows high-level steps for generating a signature for voice segment implemented in accordance with certain embodiments of the invention. The System receives a large-scale database of speech (10) with relevant database of text (11) and generates a database of Robust Signatures (5) to patches of the speech signals (13) provided in the original database.

Figure 5:
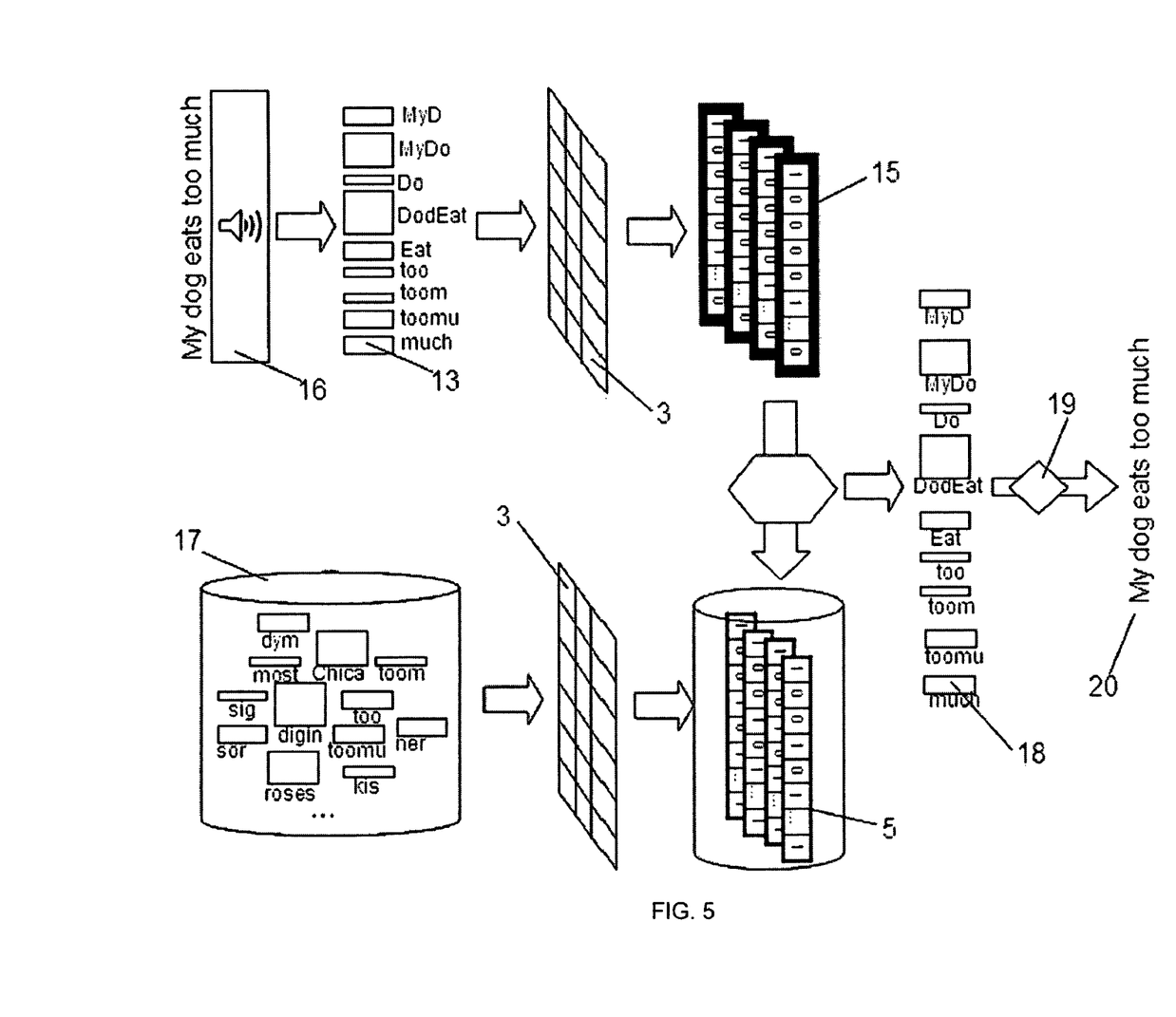
FIG. 5 is a diagram depicting a process executed by a Large-Scale Speech-to-Text System as implemented in accordance with certain embodiments of the invention.

FIG. 5 shows more detailed overall process of speech-to-text translation implemented in accordance with certain embodiments of the invention. In the process of speech-to-text translation, the system performs first speech-to-speech match, i.e. the system finds M best matches (18) between the speech-segment received as an input (16), and the N speech-segments provided in the training database (17). Similar to the case of visual signal, the match between two speech-segments should be invariant to a certain set of statistical processes performed independently on two relevant speech-segments, such as generation of the speech by different speakers, plurality noisy channels, various intonations, accents and more. Moreover, the process of matching between a certain speech-segment to a database consisting of N segments, cannot be done by matching directly the speech-segment to all N speech-segments, for large-scale N, since such a complexity of O(N), will lead to non-practical response times. Thus, the representation of speech-segments by Robust Signatures is critical application-wise. The System embodies a specific realization of The Architecture for the purpose of Large-Scale Speech-to-Speech System invention and definition. Finally, after matching the speech-segment to M best matches in database, the relevant text attached to the M segments is post-processed (19), generating the text (20) of the speech-segment provided as an input.

High-level description of the system is further depicted, in FIG. 5. Speech-segments are processes by computational Cores (3), a realization of The Architecture (see cores generator for Large-Scale Speech-to-Text System). The Cores (3) generate a database of Signatures (5) for a large-scale database of speech-segments (17) and Robust Signatures (15) for speech-segment presented as an input (16). The process of signature generation is described below. Next, Robust Signatures (15) and/or Signatures (5) are effectively matched to Robust Signatures (15) and/or Signatures (5) in the database to find all matches between the two, and finally extract all the relevant text to be post-processed and presented as a text output (20).

Signatures Generation

Figure 6:
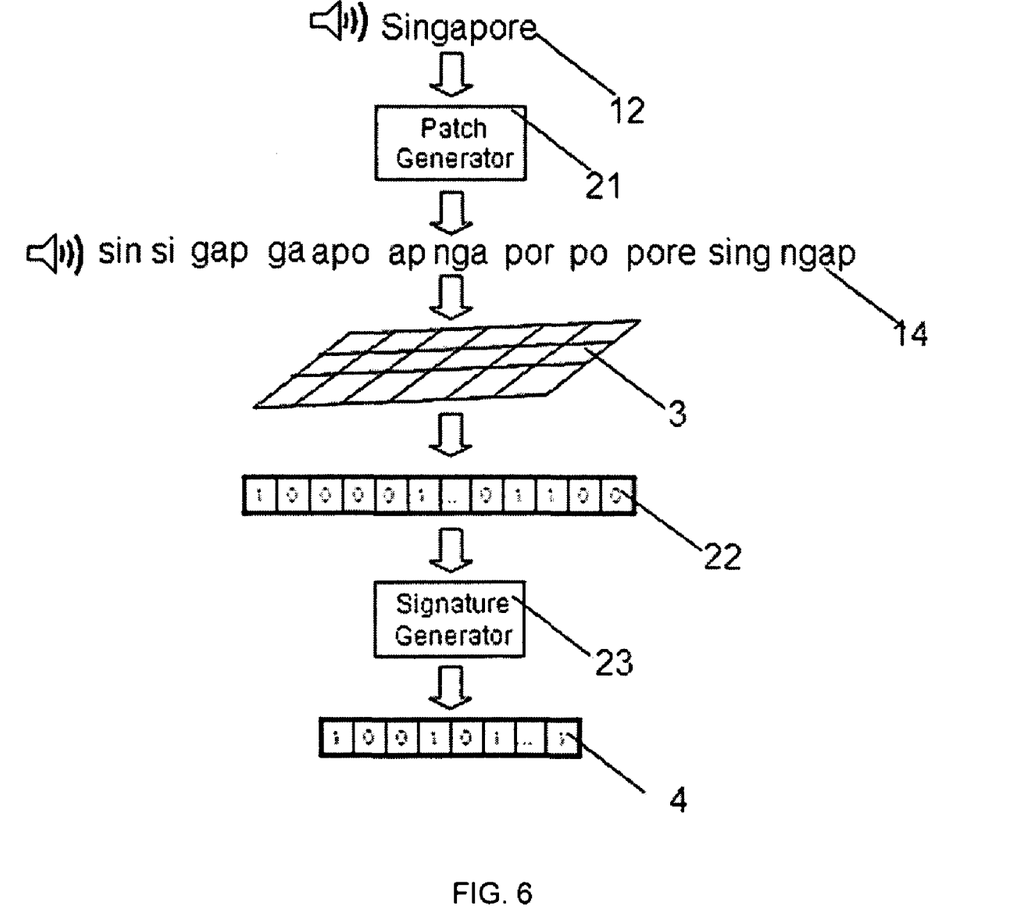
FIG. 6 is a diagram showing the flow of patches generation, response vector generation, and signature generation in a Large-Scale Speech-to-Text System implemented in accordance with certain embodiments of the invention.

The signatures generation process will be described with reference to FIG. 6. The first step in the process of signatures generation from a given speech-segment is to break-down the speech-segment to K patches (14) of random length P and random position within the speech segment (12). The breakdown is performed by the patch generator component (21). The value of K and the other two parameters are determined based on optimization, considering the tradeoff between accuracy rate and the number of fast matches required in the flow process of the System.

In the next step, all the K patches are injected in parallel to all L computational Cores (3) to generate K response vectors (22).

Having L computational cores, generated by the cores generator for Large-Scale Speech-to-Text System, a patch i is injected to all the computational cores. Processing by the computational cores yields a response vector $\vec{R}$, for example, in the following way:

A computational core $C_i$ consists of a m nodes (LTUs), generated according to cores-generator: $C_i = \{n_{im}\}$.

$$n_{im}(t) = \theta(V_i(t) - Th)$$

$$V_i(t) = (1 - L)V_i(t-1) + V_{im}$$

$$V_{im} = \sum_j w_{i,j,n} k_{i,j}$$

$w_{ij}$ is a CNU between node j (in Core i) and patch component n (for example, MFCC coefficient), and/or between node j and node n in the same core i.

$k_{i,j}$ is a patch component n (for example, MFCC coefficient), and/or node j and node n in the same core i.

$\theta$ is a Heaviside step function; and

Th is a constant threshold value of all nodes.

The response vector $\vec{R}$ is the firing rate of all nodes, $\{n_{im}\}$. The Signature (4) and the Robust Signature may be generated, for example, similarly as to the case of video content-segment, i.e., $\vec{S}$ by applying the threshold $\vec{Th_S}$ to $\vec{R}$, and $\vec{RS}$ by applying the threshold $\vec{Th_{RS}}$ to $\vec{R}$.

Speech-to-Speech-to-Text Process

Upon completion of the process of speech-to-speech matching, yielding M best matches from the database, the output of the relevant text is obtained by post-processing (19) of the attached text to the M records, for example, by finding the common dominator of the M members.

As an example, if the match yielded the following M=10 attached text records:
This dog is fast
This car is parking
Is it barking
This is a dog
It was barking
This is a king
His dog is playing
He is barking
This dog is nothing
This frog is pink
The output text to the provided input speech-segment will be:
... this dog is barking ...

The proposed System for speech-to-text constitutes a major paradigm-shift from existing approaches to the design of prior art speech-to-text systems in several aspects. First, it is not model-based, i.e. no models are generated for phonemes, key-words, speech-context, and/or language. Instead, signatures generated for various speech-fragments, extract this information, which is later, easily retrieved, by low-cost database operation during the recognition process. This yields a major computational advantage in that no expert-knowledge of speech understanding is required during the training process, which in the disclosed method and its embodiment is signature generation. Second, the System does not require an inference of the input speech-segment to each of the generated models. Instead, for example, the Robust Signature generated for the input segment is matched against the whole database of signatures, in a way which does not require a complexity greater than O(logN). This yields inherent scalability characteristic of the System, and extremely short response times.

Synthesis for Generation of Large-Scale "Knowledge" Databases

One of the main challenges in developing speech-to-text systems, with superior performance, is the process of collecting a large-scale and heterogeneous enough, "training" database. In the sequel, an innovative approach for meeting this challenge is presented. For the purpose of large-scale database generation of transcribed speech, a prior art synthesizers is used. A synthesizer receives two inputs: (1) Large text database (2) Speech data-base with multiple speakers, intonations, etc., and generates a large database of heterogeneous speech, transcribed according to the provided text database. The generated large-scale database of transcribed speech is used according to the presented System flow.

Large-Scale Classification Paradigm-Shift

The presented System implements a computational paradigm-shift required for classification tasks of natural signals, such as video and speech, at very large scales of volume and speed. For very large-scale tasks, such as the classification tasks related to the web content and/or any other large-scale database in terms of volume and update frequencies, the required performance envelope is extremely challenging. For example, the throughput rate of The System signature generation process should be equal to the rate of update process of the content database. Another example is the false-alarm or false-positive rate required for the System to be effective. 1% false-positive rate for a certain content-segment may turn to 100% false-positive rate for a data-base of N content-segments being matched against another large-scale data-base. Thus, the false-positive rates should be extremely low. The presented System does afford such a low false-positive rate due to the paradigm-shift in its computational method for large-scale classification tasks. Unlike, prior art learning systems which generate a complex hyper-plane separating a certain class from the entire "world", and/or model-based method, which generate a model of a certain class, the presented System generates a set of Robust Signatures for the presented samples of the class according to teachings described above. Specifically, the signatures are generated by maximally independent, transform/distortions-invariant and signal-based characteristics optimally designed computational cores. The generalization from a certain set of samples to a class is well defined in terms of invariance to transforms/distortions of interest, and the signatures' robustness, yielding extremely low false-positive rates. Moreover, the accuracy is scalable by the signatures length due the low dependence of the computational cores.

Figure 7:
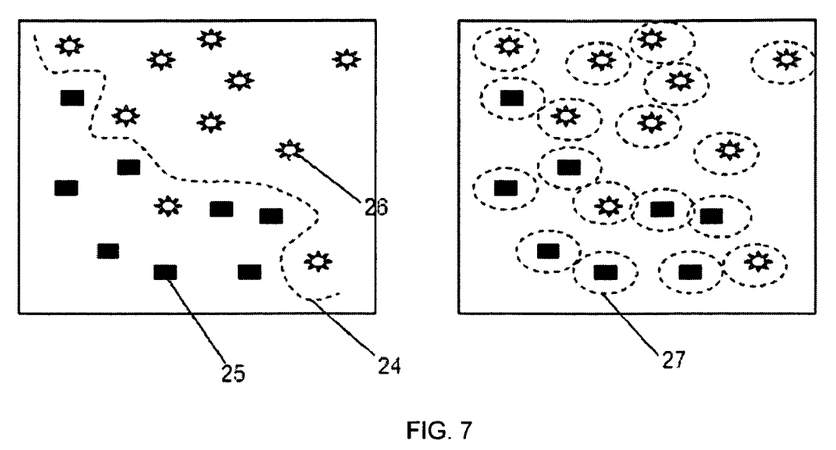
FIG. 7 is a diagram showing the difference between complex hyper-plane generated by prior art techniques, and the large-scale classification techniques where multiple robust hyper-plane segments are generated.
Figure 8:
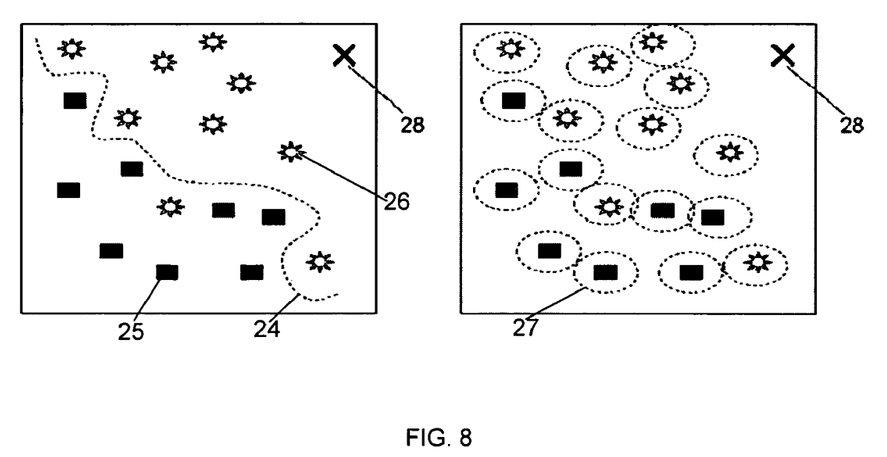
FIG. 8 is a diagram showing the difference in decision making using prior art techniques and the disclosed techniques, when the sample to be classified differs from other samples that belong to the training set.
Figure 9:
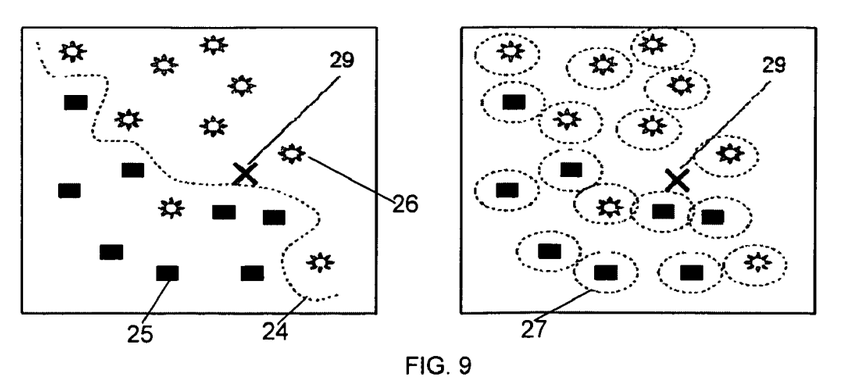
FIG. 9 is a diagram showing the difference in decision making using prior art techniques and the disclosed techniques, in cases where the sample to be classified closely resembles samples that belong to two classes.

Several differences between the prior art techniques and the scale classification technique taught by the invention are illustrated in FIGS. 7, 8 and 9. Specifically, FIG. 7 shows a diagram illustrating the difference between complex hyper-plane the large-scale classification where multiple robust hyper-plane segments and are generated, prior art classification shown on the left and classification according to the principles of the invention on the right. Prior art classification attempts to find a sophisticated classification line (24) that best separates between objects (25) belonging to one group and objects (26) that belong to another group. Typically, one or more of the objects of one group are found to be classified into the other group, in this example, there is an object (26) within the group of different objects (25). In accordance with an embodiment of the invention, each object is classified separately (27) and matched to its respective objects. Therefore an object will belong to one group or another providing for a robust classification. FIG. 8 illustrates the difference in decision making when the sample to be classified differs from other samples that belong to the training set, prior art classification shown on the left and classification according to the principles of the invention on the right. When a new object (28), not previously classified by the system is classified according to prior art as belonging to one group of objects, in this exemplary case, objects (26). In accordance with the disclosed invention, as the new object (28) does not match any object (27) it will be recorded as unrecognized, or no match. FIG. 9 shows the difference in decision making in cases where the sample to be classified closely resembles samples that belong to two classes, prior art classification shown on the left and classification according to the principles of the invention on the right. In this case the new object (29) is classified by prior art systems as belonging to one of the two existing, even though line (24) may require complex computing due to the similarity of the new object (29) to wither one of the objects (25) and (26). However, in accordance with an embodiment of the invention, as each object is classified separately (27) it is found that the new object (29) does not belong to any one of the previously identified objects and therefore no match is found.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What we claim is:

1. An apparatus for generating a signature of an input signal comprising:
    a plurality of computational cores coupled to the input signal, each core having properties that have at least some statistical independency from other of said computational cores, said properties are independent of each other core, wherein the properties of each of the plurality of computational cores include a first threshold and a second threshold, each of the plurality of computational cores generates, responsive to the input signal and said first threshold and said second threshold a first signature element and a second signature element respectively, said first signature element being a robust signature;
    wherein a plurality of said first signature elements comprise a first signature of the input signal and a plurality of said second signature elements comprise a second signature of the input signal, said first signature is generated respective of a robust selection criterion and said first threshold and said second signature is generated respective of said second threshold, wherein said first threshold is higher than said second threshold, said first signature being robust to noise and distortion.

2. The apparatus of claim 1, further comprising:
    a computation unit that receives said first signature and said second signature and enabled to perform at least one of:
    comparing said first signature to at least one of a first signature of at least one previous input signal or a second signature of said at least one previous input signal; and
    comparing said second signature to at least one of a first signature of at least one previous input signal or a second signature of said at least one previous input signal.

3. The apparatus of claim 1, further comprising:
    a matching unit capable of matching at least one of said first signature and said second signature to a plurality of previously determined first signatures and second signatures and generating a list of those said previously determined first signatures and second signatures in a descending order of matching to said first signature and said second signature.

4. The apparatus of claim 3, further comprising:
    a database coupled to said matching unit and enabled to provide said plurality of previously determined first signatures and second signatures.

5. The apparatus of claim 4, wherein said plurality of previously determined first signatures and second signatures correspond respectively to a plurality of previously received input signals.

6. The apparatus of claim 1, wherein said properties being defined according to at least one random parameter.

7. The apparatus of claim 1, wherein said input signal is a multimedia signal, wherein said multimedia signal is at least one of: an audio signal and a signal video.

8. The apparatus of claim 7, wherein said multimedia signal further comprises text.

9. The apparatus of claim 1, wherein the robust selection criterion at least includes a set of first signature elements and second signature elements with a highest firing-rate.

10. A large-scale matching system, comprising:
an interface for receiving an input signal;
a signature generator coupled to said interface and includes a plurality of computational cores that process said input signal, each core having properties that have at least some statistical independency from other of said computational cores, said properties are independent of each other core, wherein the properties of each of the plurality of computational cores include a first threshold and a second threshold, the signature generator generates a first signature responsive of said input signal and a second signature responsive of said input signal, wherein said first signature is determined respective of a robust selection criterion and said first threshold and said second signature is determined respective of said second threshold, wherein said first threshold is higher than said second threshold, said first signature is being robust to noise and distortion; and
a matching unit capable of matching at least one of said first signature and said second signature to at least one of a previously determined first signature and a previously determined second signature of a corresponding previously received input signal for the purpose of determining a match between said input signal and said previously received input signal.

11. The large-scale matching system of claim 10, further comprising:
a database coupled to said matching unit, wherein said database containing said previously determined first signature and said previously determined second signature.

12. The large-scale system of claim 10, wherein the robust selection criterion at least includes a set of first signature elements and second signature elements with a highest firing-rate.

13. A method for generating a signature of an input signal, comprising:
generating a first signature responsive of said input signal;
generating a second signature responsive of said input signal, wherein said first signature is generated respective of a robust selection criterion and a first threshold and said second signature is generated respective of a second threshold, wherein said first threshold is higher than said second threshold, said first signature being robust to noise and distortion; and
matching at least one of said first signature and said second signature to at least one of a previously generated first signature and a previously generated second signature responsive of a previous input signal.

14. The method of claim 13, further comprising:
retrieving said previously generated first signature and said previously generated second signature from a database.

15. The method of claim 13, wherein the generation of said first signature and said second signature is performed by a signature generator, wherein said signature generator includes a plurality of computational cores adapted to process said input signal, wherein each computational core having properties that have at least some statistical independency from other of said computational cores.

16. The method of claim 15, further comprising:
setting said properties for said each core independently from each other core.

17. The method of claim 16, further comprising:
setting said properties according to at least one random parameter.

18. The method of claim 13, further comprising:
matching said input signal to a plurality of previous input signals; and
determining a level of match of each of said plurality of previous input signals to said input signal.

19. The method of claim 13, wherein said input signal is a multimedia signal, wherein said multimedia signal is at least one of: an audio signal, and a video signal.

20. The method of claim 19, wherein said multimedia signal further comprises text.

21. A non-transitory computer readable medium having stored thereof computer executable code causing a computer to execute the process of generating a signature of an input signal, comprising:
generating a first signature responsive of said input signal;
generating a second signature responsive of said input signal, wherein said first signature is generated respective of a robust selection criterion and a first threshold and said second signature is generated respective of a second threshold, wherein said first threshold is higher than said second threshold, said first signature being robust to noise and distortion; and
matching at least one of said first signature and said second signature to at least one of a previously generated first signature and a previously generated second signature responsive of a previous input signal.

22. The method of claim 13, wherein the robust selection criterion at least includes a set of first signature elements and second signature elements with a highest firing-rate.

* * * * *